United States Patent [19]

Kowalk et al.

[11] Patent Number: 5,617,415
[45] Date of Patent: Apr. 1, 1997

[54] INTERCONNECTION ELEMENT FOR AN ASYNCHRONOUS TIME-DIVISION MULTIPLEX TRANSMISSION SYSTEM

[75] Inventors: Wolfgang Kowalk, Oldenburg; Hans-Georg Keller, Aachen, both of Germany

[73] Assignee: U.S. Philips Corporation, New York, N.Y.

[21] Appl. No.: 674,492

[22] Filed: Mar. 25, 1991

[30] Foreign Application Priority Data

Apr. 2, 1990 [DE] Germany .................... 40 10 535.0

[51] Int. Cl.⁶ ........................... H04Q 11/04; H04J 3/24
[52] U.S. Cl. ................... 370/395; 370/417; 370/468
[58] Field of Search .................. 370/60, 60.1, 84, 370/94.1, 94.2

[56] References Cited

U.S. PATENT DOCUMENTS

| | | | |
|---|---|---|---|
| 4,782,478 | 11/1988 | Day, Jr. et al. ..................... | 370/60 |
| 4,891,802 | 1/1990 | Jasmer et al. ..................... | 370/60 |
| 4,969,149 | 11/1990 | Killat et al. ..................... | 370/60 |
| 5,067,124 | 11/1991 | Killat et al. ..................... | 370/60 |
| 5,128,927 | 7/1992 | Killat et al. ..................... | 370/60 |
| 5,138,612 | 8/1992 | Keller et al. ..................... | 370/60 |

*Primary Examiner*—Stephen Chin
*Assistant Examiner*—T. Ghebretinsae
*Attorney, Agent, or Firm*—David R. Treacy

[57] ABSTRACT

The invention relates to an asynchronous time-division multiplex transmission system comprising an interconnection element, which element transmits cells supplied by auxiliary lines (6) and destined for a trunk line (8) at a preset interconnection element transmission rate and which comprises cell filters (7) coupled to each of the auxiliary lines, which filters pass the cells for storage in intersection buffers (15) coupled to each cell filter when the path identification contained in the cells is allocated to the trunk line. An output buffer (17) supplying cells to the trunk line is connected to the outputs of the intersection buffers. The cells are transmitted between the intersection buffers and the output buffer at a temporary transmission rate which is increased relative to the element transmission rate.

19 Claims, 3 Drawing Sheets

INTERCONNECTION ELEMENT FOR AN ASYNCHRONOUS TIME-DIVISION MULTIPLEX TRANSMISSION SYSTEM

BACKGROUND OF THE INVENTION

The invention relates to an asynchronous time-division multiplex transmission system comprising an interconnection element, which element transmits cells supplied by auxiliary lines and destined for a trunk line at a preset interconnection element transmission rate and which comprises cell filters coupled to each of the auxiliary lines, which filters pass the cells for storage in intersection buffers coupled to each of the cell filters when the path identification contained in the cells is allocated to the trunk line.

In the asynchronous time-division multiplex transmission system useful information, for example, telephone, picture or sound signals, is transmitted in fixed-length blocks over digital signal processing arrangements. A fixed-length block is understood to be a cell that has a preset number of bits in a serial order. Each cell comprises a header and an information field. The header field comprises, for example, the path identification for the cell. A path identification is understood to be a connection identification or path routing information. The connection identification comprises the data on the target or sub-target for the useful information. Within the system the path routing information is added in specific transmission arrangements and this information contains data on a sub-target in the transmission arrangement. The useful information is accommodated in the information field.

Cells are successively allocated to certain time intervals (time frames). The duration of such a time interval depends on the clock frequency employed for the transmission components. If no useful information is available, idle cells, i.e. cells without useful information, are transmitted in such a time frame. Cells that do contain useful information are denoted useful cells.

During the transmission of the cells among subscribers, the cells pass through switching networks in which paths are formed by means of path identification evaluation. Such a switching network is habitually composed of a plurality of switching network blocks. Such a switching network block which has a plurality of auxiliary lines and trunk lines is constituted by a plurality of interconnection elements. An interconnection element is connected to a plurality of auxiliary lines and a trunk line. In an interconnection element cells are passed from an auxiliary line to a trunk line. When cells arrive from a plurality of auxiliary lines during a time frame, which cells wish to access a trunk line, specific coupling strategies are necessary.

Aforesaid interconnection element is disclosed in patent application P 38 33 490 to which U.S. Pat. No. 5,067,124 corresponds. The cells then occurring on the auxiliary lines are stored in an intersection buffer for each line if a cell filter passes cells to the intersection buffer. In the cell filter the cell is stored in a register and by means of a comparator it is checked on the basis of the cell path identification and the trunk line address stored in the address memory whether the cell is allocated to the trunk line. If the cell is to be passed to the trunk line, it is stored in the intersection buffer. Cells that do not belong to this trunk line are checked in further interconnection elements. If the intersection buffers are released to be read out, they apply cells to the trunk line. Decisions on the order in which the cells are read out are made by an allocation circuit in which the cells, in the order in which they have been written, are released to be read out. If a plurality of cells have arrived simultaneously, they will be read out in a predetermined order. In an interconnection element of this type, various intersection buffers may be loaded more than other buffers. Since the intersection buffers have all equal storage capacity and the size of an intersection buffer is determined in such a way that no cells are lost in the case of high load, intersection buffers having a large storage capacity are necessary.

SUMMARY OF THE INVENTION

Therefore, it is an object of the invention to provide an asynchronous time-division multiplex transmission system comprising an interconnection element for which a smaller storage capacity is sufficient.

In an asynchronous time-division multiplex transmission system comprising an interconnection element of the type set out in the opening paragraph this object is achieved, in that an output buffer delivering cells to the trunk line is coupled to the outputs of the intersection buffers and in that the cells are transmitted between the intersection buffers and the output buffer at a temporary, or output loading, transmission rate which is increased relative to the transmission rate of the interconnection element.

In this interconnection element the arriving cells and those allocated to the trunk line are written in the respective intersection buffers at a specific element transmission rate. The element transmission rate is understood to mean the speed at which the cells are processed up to the cell buffer and are written in the cell buffer. The cells from the intersection buffers are read out with an increased speed, thus at a temporary transmission rate increased relative to the element transmission rate and written in an output buffer. The order in which the intersection buffers are read out is to be such that cells arriving first at the intersection buffer are also written first in the output buffer. When cells arrive simultaneously, a specific reading order for the intersection buffers can be predetermined. The reading of the cells from the output buffers is then again effected at the element transmission rate. The dwell time of the cells in the intersection buffers is reduced because between the intersection buffers and the output buffer the transmission rate has been increased and thus, markedly less storage capacity is necessary as a result of this. As opposed to the intersection buffers the output buffer need not be devised for a non-uniform load. The storage capacity of the intersection buffers of the interconnection element according to the invention is to be devised to be smaller than the storage capacity of the intersection buffers disclosed in patent application P 38 33 490, because the dwell time of the cells in the intersection buffers of the interconnection element according to the invention is shorter. As a result, also the storage capacity of all buffers of the interconnection element according to the invention is reduced compared to the prior-art interconnection element.

It should further be observed that, in an article entitled "Asynchrone Zeitvielfachübermittlung für Breitbandnetze" by U. Killat, ntZ, Vol. 40, 1987, No. 8, pp. 572 to 576, FIG. 5, an interconnection element is disclosed wherein input buffers are used in which each arriving cell is stored. Once a cell has been read out from an input buffer, a cell filter checks whether the cell is allocated to the trunk line. For a reduction of the cells in the input buffer when the auxiliary lines carry a heavy load, it is proposed to increase the speed in the switching network. For this purpose, buffers are then necessary in the output lines. In this switching network, when cells arrive over two auxiliary lines during a time frame which are to be passed to the same trunk line, the passage of one cell is obstructed (storage of the cell in an input buffer). When in the next time frame another cell supplied over the auxiliary line, over which the previously stored cell was supplied, is to be passed to a second trunk line, this cell cannot be passed on until the stored cell has been transmitted. The resulting limitations imply time delays which cannot occur in the interconnection element according to the invention. The increase of the speed in this switching network is thus meant to prevent blockings.

An increase of the temporary transmission rate relative to the element transmission rate may be realised for a serial transmission of the bits of a cell by increasing the clock rate. However, for the moment such a measure concerning the circuitry cannot be implemented as the necessary speeds cannot be realised with available integrated circuit technology. A simple measure can be implemented in that the cells between the intersection buffers and the output buffer are transmitted at least partly in parallel. A complete parallel transmission of a cell would be understood to mean the simultaneous transmission of all bits of a cell. In a partly parallel transmission of the cell some bits of the cell are transmitted within a time frame and the other bits of the cell in the next time frame. For example, with a cell containing 100 bits and with a fivefold increase of the speed, 5 bits are each time transmitted to the output buffer within a time frame.

Buffers have each a parallel and a serial input and a parallel and a serial output. In the serial input or serial output, data are written or read out in series, respectively, and in the parallel input or parallel output, data are written or read out in parallel, respectively. For transmitting the cells at least partly in parallel it is therefore provided that at least several parallel outputs of the intersection buffers are coupled to the corresponding parallel inputs of the output buffer. If all bits of a cell are to be read out at once, all parallel outputs of an intersection buffer are to be coupled to the corresponding parallel inputs of the output buffer. If a partly parallel transmission is effected, however, only some parallel outputs of the intersection buffers are coupled to the corresponding parallel inputs of the output buffer. Since the buffers usually operate according to the principle of a shift register, the connection lines between the parallel outputs of the intersection buffers and the parallel inputs of the output buffer are distributed symmetrically so as to provide a simple control of the transmission process. For example, with a cell 100 bits in length and with a speed which is 10 times as high, every 10th parallel output of an intersection buffer is coupled to a parallel input of the output buffer respectively, by way of a connection line. Thus there are 9 inputs or outputs, respectively, without a link by way of a connection line between the parallel inputs or parallel outputs, respectively, linked to a connection line. In this example the bits of the cell are transmitted over the connection lines for a duration of ten consecutive time frames.

For controlling the reading from the intersection buffers, an allocation circuit is provided, to which each cell filter reports the arrival of a cell for the trunk line and which controls the reading from the intersection buffers in such a way that the cells are read out in accordance with their time of arrival and, in case they have arrived simultaneously, in accordance with a predetermined order. For the interconnection element according to the invention the allocation circuit described, for example, in patent application P 38 33 490 may be used.

A cell filter associated to each auxiliary line each time checks whether a cell is written in an intersection buffer. Such a cell filter comprises a register in which a cell supplied over an auxiliary line is written, and also comprises a comparator which checks on the basis of the path identification of the arrived cell and the information supplied by the memory whether the cell is allocated to the trunk line. If the identification is correct, the comparator releases the intersection buffer coupled to the register so that it can be read out.

The interconnection element is to be dimensioned in such a way that the input buffers are devised smallest possible. In order to fulfil this requirement, the factor by which the temporary transmission rate is increased relative to the element transmission rate is to be selected very high. For the case where there is parallel data processing, this means that there are many connections between the intersection buffers and the output buffer. However, as the space on an integrated circuit is limited, so is the number of lines. Consequently, it has appeared that the optimum factor by which the temporary transmission rate is increased relative to the element transmission rate, lies at three. In this case the intersection buffers can be devised in such a way that they are able to store a maximum of 3 cells.

Interconnection elements are usually devised for a specific number of auxiliary lines. For realising, for example, exchanges with a rather large number of auxiliary lines, it is necessary for a plurality of interconnection elements leading to a single trunk line to be connected in parallel. It should then be provided that the output buffers of the interconnection elements are coupled each to stage buffers and that the cells supplied by the interconnection elements are transmitted to the stage buffer at a stage transmission rate which is increased relative to the element transmission rate. As a result of the increased stage transmission rate relative to the element transmission rate there will practically not be any dwell times of the cells in the intersection buffers or output buffers of the interconnection elements, so that also the storage capacity of the buffers as a whole may be selected to be smaller than with a simple parallel circuit of interconnection elements. For an interconnection stage of this type it is necessary that a stage allocation circuit controls the reading of the cells from the interconnection elements and the writing of these cells in the stage buffer. Such an allocation circuit could be arranged in a manner described hereinbefore with respect to the allocation circuit for an interconnection element.

With another option to combine a plurality of interconnection elements to a single interconnection stage it is provided that the output buffers of the interconnection elements are connected each to a stage-trunk line. In this case the reading from the output buffers is controlled by means of a second stage allocation circuit.

Exemplary embodiments of the invention will be further explained hereinbelow with reference to the drawings.

DESCRIPTION OF THE PREFERRED EMBODIMENTS

The principle of an asynchronous time-division multiplex transmission system can be explained with reference to the block diagram represented in FIG. 1. The signals of a terminal device, for example, telephone, picture or sound signals, are segmented in a packetiser and provided with a header field containing a path identification. The path identification contains the indication of the target of the signals. Such a terminal device and the packetiser form a subscriber's terminal arrangement 1. The data of such a terminal device are then transmitted in the form of cells in consecutive time intervals (time frames). The duration of one of these time frames then depends on the basic clock frequency of a transmission component.

Such cells comprise the header field mentioned above and the useful information. If, within a time frame, no data are transmitted, an empty cell is formed which is a cell in which there is an indication in the header field that no further information is to follow. Such empty cells are used for synchronizing the system. The cells carrying useful information are denoted useful cells.

Figure 1:
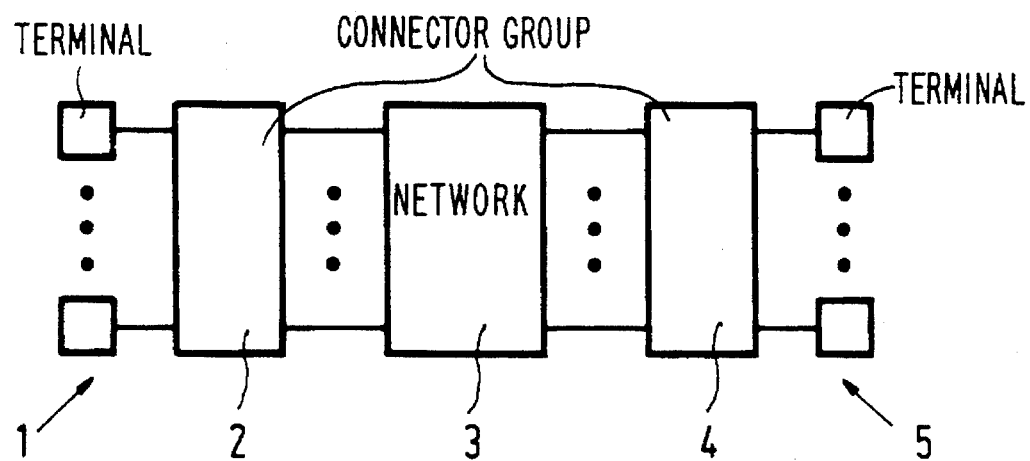
FIG. 1 shows a block diagram of an asynchronous time-division multiplex transmission system.

In the block diagram shown in FIG. 1, the data of, for example, 64 subscriber terminal units 1 are transmitted to a connector group 2, over 64 lines having each a capacity of 150 Mbit/s. The data are combined in the connector group 2 and transmitted over a lower number of lines having a higher capacity. For example, these data can be conveyed over 16 lines having each a capacity of 600 Mbit/s. Data switching is effected in a subsequent switching network 3, formed by a plurality of switching network blocks in their turn being formed by a plurality of interconnection elements, by evaluating the path identification and applying the data to a specific trunk line. In this case an interconnection element consists of a circuit arrangement connected to a plurality of auxiliary lines and to a trunk line. The circuit arrangement can determine data to be transported over the trunk line linked to the interconnection element, and the interconnection element can create the necessary paths within the circuit arrangement. The switching network 3 has a plurality of lines, for example, 16 lines having a capacity of 600 Mbit/s, connected to a connector group 4. The connector group 4 passes the received data over lines to subscriber terminal units 5. For this purpose, 64 lines are provided having each a capacity of, for example 150 Mbit/s. Such a system processes the data in a bidirectional manner, i.e. these data are furthermore transmitted from the subscriber terminal unit 5 to the subscriber terminal unit 1.

Figure 2:
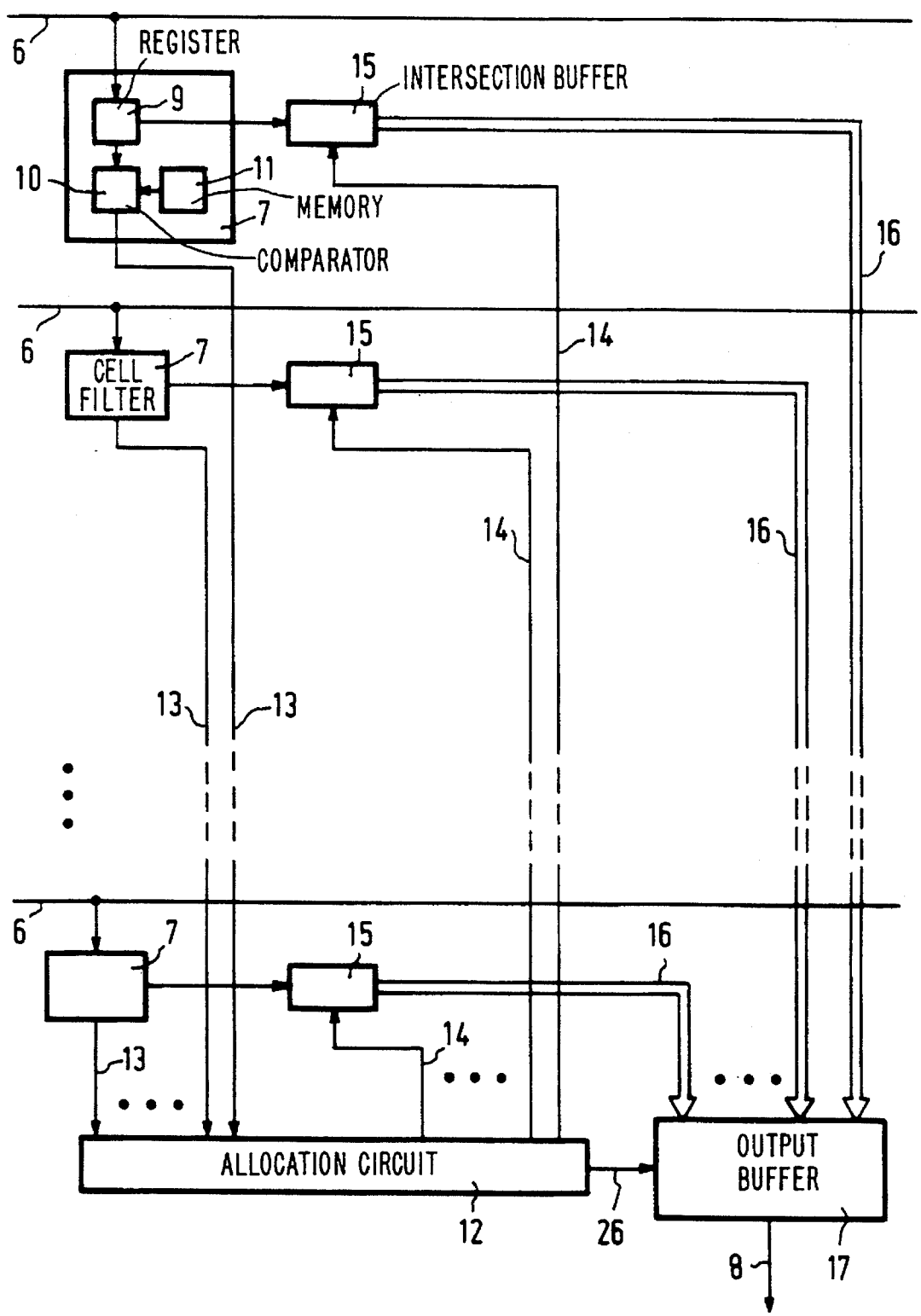
FIG. 2 shows a simplified interconnection element.

FIG. 2 shows an interconnection element which forms part of a switching network. The interconnection element is connected to a plurality of auxiliary lines 6. To each auxiliary line 6 is connected a cell filter 7 which checks whether the arrived cell is to be conveyed to a trunk line 8. Each cell filter 7 comprises a register 9, a comparator 10 and a memory 11. Each register 9 is connected to an auxiliary line 6. The path identification of the cell stored in register 9 is transported to the comparator 10 over one line and information from memory 11 is transported to the comparator over a second line. The comparator 10 establishes on the basis of the path identification and the information from memory 11 whether the path identification is allocated to the trunk line 8. If the cell stored in the register 9 is to be transported to the trunk line 8, the comparator applies a signal to an allocation circuit 12 over a line 13. The allocation circuit 12 then releases via lines 14 an intersection buffer 15 connected to the register 9 so that the cell stored in register 9 can be written in intersection buffer 15.

The allocation circuit 12 stores the order in which the cells have been written from the cell filters 7 in the respective intersection buffers 15 and conveys these cells to an output buffer 17 over connection lines 16 in the same order in time. If cells have been written in a plurality of intersection buffers simultaneously, the cells are read out from the intersection buffers 15 in a specific order in time. An allocation circuit of this type is known, for example, from patent application P 38 33 490. The instruction to read the intersection buffers 15 is given by the allocation circuit 12 also over the lines 14. From the output buffer 17 one cell per time interval is transported to the trunk line 8.

The speed with which the cells are supplied to the cell filter 7 and processed until they are written in the intersection buffer 15, corresponds to a specific element transmission rate. Up to the intersection buffer 15 the transmission rate of the cells thus depends on a specific clock rate. However, the cells are transmitted over the connection lines 16 at an increased rate, i.e. at an increased temporary transmission rate, from the intersection buffers 15 to the output buffer 17. Such an increase of the speed can be effected by increasing the clock rate. However, there is a simpler possibility in that the individual bits of the cells are transmitted at least partly in parallel, that is to say, that a specific number of bits of the cell are transmitted over the connection lines 16 simultaneously.

Figure 3:
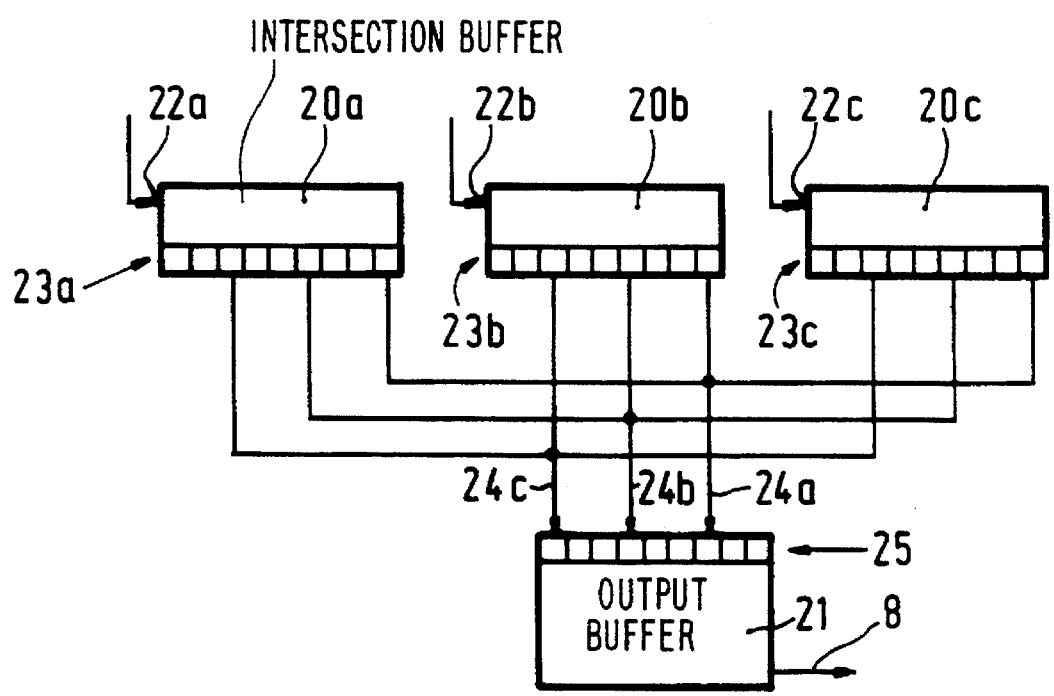
FIG. 3 shows a circuit arrangement for explaining the parallel processing of the cells between intersection buffers and an output buffer.

For a further clarification of the parallel processing of the cells over the connection lines 16, FIG. 3 shows a simplified example with three intersection buffers 20a to c and a single output buffer 21. For this example the cell length is to be 9 bits. The intersection buffers 20a to 20c have each a serial input 22a to c, in which a cell is written in series. Furthermore, the intersection buffers 20a to 20c have each a parallel output from which the cells can be read out in parallel. The drawing symbolically shows output storage locations 23a to 23c for the intersection buffers 20a to 20c, from which the bits of a cell can be read out in parallel. The first buffer cell of the output storage locations 23a to 23c is connected to a connection line 24a, the fourth buffer cell of the output storage locations 23a to 23c to a connection line 24b and the seventh buffer cell of the output storage locations 23a to 23c to a connection line 24c. The first, the second and the third bit of the cell are transmitted over the connection line 24a, the fourth, fifth and sixth bit of the cell over the connection line 24b and the seventh, eighth and ninth bit of the cell are transmitted over the connection line 24c during consecutive time frames. In each time frame the bits of one cell are shifted through the storage locations to the connection lines (shift register principle).

The drawing also symbolically shows input storage locations 25 for the output buffer 21. There are also 9 input storage locations 25 in the output buffer 21. The connection line 24a is then connected to the third storage location, the line 24b to the sixth and the connection line 24c to the ninth storage location. As a result of this partly parallel processing of the cells between the intersection buffers 20a to 20c and the output buffer 21 a threefold speed increase is attained because 3 bits are each time shifted in parallel with the output buffer 21 over the connection lines 24a to 24c. The data are serially transported to the trunk line 8 from the output buffer 21.

The optimum factor for the increase of the speed has turned out to be 3. The temporary transmission rate is thus to be increased by the factor of 3 relative to the element transmission rate. In this case the number of cells to be stored in an intersection buffer 15 may be limited to a maximum of three.

As shown in FIG. 2, the reading process from the output buffer 17 is also controlled by the allocation circuit 12 over a control line 26. In that case a cell is to be transported from the output buffer 17 to the trunk line 8 in each time frame.

It should be observed that the lines represented in FIG. 2 have for clarity been depicted partly in the form of a single line, although they are often constituted by a plurality of parallel lines. Also the clock lines and clock generators necessary for controlling the individual digital circuit elements have not been represented.

Figure 4:
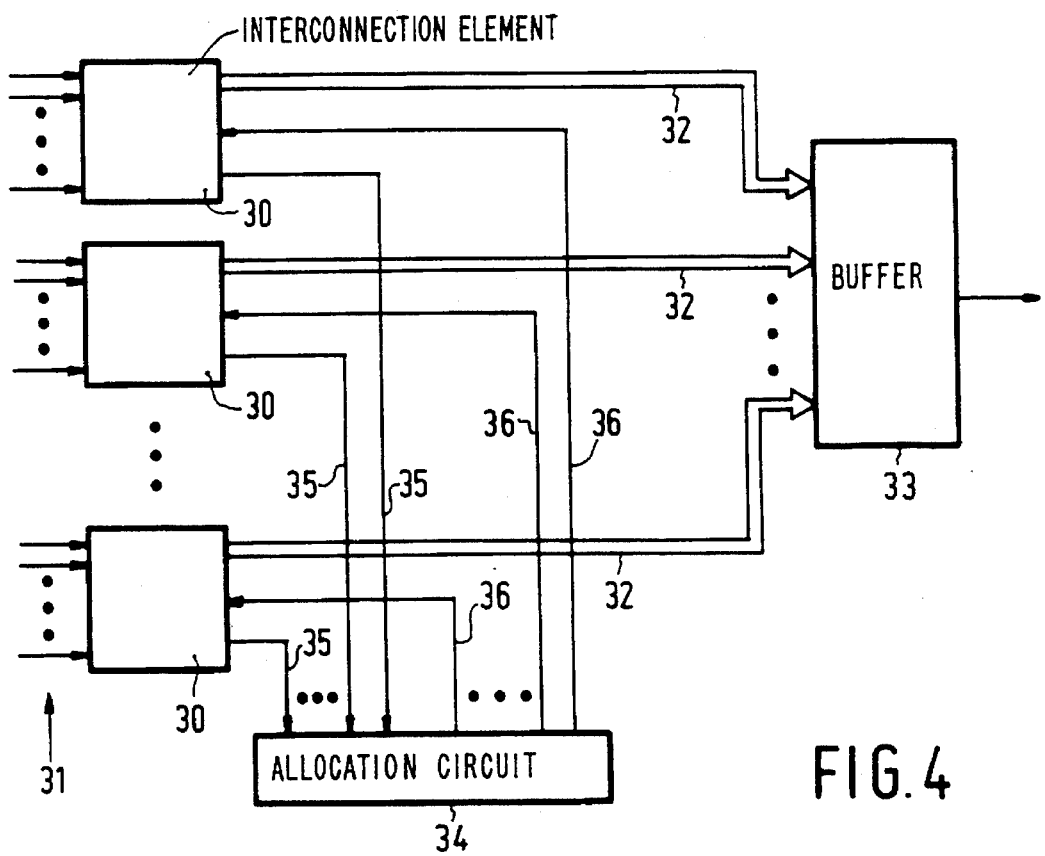
FIGS. 4 and 5 show interconnection stages constituted by a plurality of interconnection elements.

FIG. 4 shows a switching network stage comprising a plurality of interconnection elements as shown in FIG. 2. Each interconnection element 30 is then connected to a plurality of auxiliary lines 31. The interconnection elements 30 are connected to a single stage buffer 33 by means of lines 32. A stage allocation circuit 34 controls the reading from the interconnection elements. The cells which are read from the interconnection elements 30 can be transmitted over the lines 32 also at a higher rate, that is to say, at a stage transmission rate which is increased relative to the element transmission rate. For this purpose, the bits of a cell can be processed in parallel. The stage allocation circuit 34 is then informed over lines 35 when cells are to be transmitted from the interconnection elements 30, and the circuit then controls this reading process over lines 36. During this operation the data which arrived first at an output buffer of an interconnection element 30 are transported to the stage buffer 33. Such a stage allocation circuit 34 may be structured in the same way as the allocation circuit of an interconnection element 30.

Figure 5:
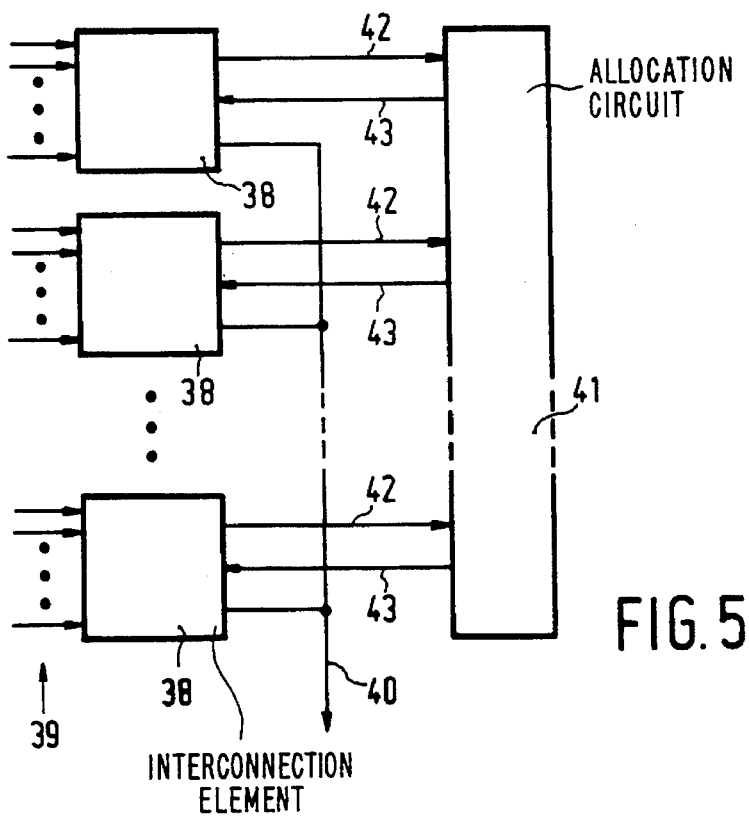

FIG. 5 shows a further switching network stage constituted by a plurality of interconnection elements as shown in FIG. 2. Each interconnection element 38 is then connected to a plurality of auxiliary lines 39. The output buffers of each interconnection element are connected to a stage trunk line 40. The reading process from the interconnection elements 38 is controlled by a further stage allocation circuit 41. For this purpose it is provided that information about each connection line 42 between an interconnection element 38 and the further stage allocation circuit 41 is applied to this further stage allocation circuit 41. The further stage allocation circuit 41 controls each interconnection element over its control line 43. This further stage allocation circuit 41 may be structured in the same way as the allocation circuit of an interconnection element 10.

We claim:

1. An asynchronous time-division multiplex transmission system for cells containing a path identification, comprising an interconnection element which transmits cells, supplied by auxiliary lines (6) and destined for a trunk line (8), at a predetermined interconnection element transmission rate, said element comprising a respective cell filter (7) connected to each of the auxiliary lines; and a respective intersection buffer (15) connected to each cell filter, said cell filter being arranged to pass a cell to the intersection buffer if the respective path identification is allocated to said trunk line, characterized in that said element comprises an output buffer (17), coupled to outputs of said intersection buffers, for delivering cells to said trunk line; and means for transmitting said cells at least partly in parallel between the intersection buffers and the output buffer, at an output loading rate which is greater than said predetermined interconnection element transmission rate.

2. Asynchronous time-division multiplex transmission system comprising an interconnection element as defined in claim 1, characterized in that at least some parallel outputs (23a to 23c) of the intersection buffers (15; 20a to 20c) are coupled to the associated parallel inputs (25) of the output buffer (17; 21).

3. Asynchronous time-division multiplex transmission system comprising an interconnection element as defined in claim 2, characterized in that each cell filter (7) reports the arrival of a cell for the trunk line (8) to an allocation circuit (12), which controls the reading process of the intersection buffers (15) in such a way that the cells are read out in the order in time in which they have arrived and when they have arrived simultaneously, in a predetermined order.

4. Asynchronous time-division multiplex transmission system comprising an interconnection element as defined in claim 3, characterized in that a cell filter (7) comprises a register (9) in which a cell supplied over an auxiliary line is written and includes a comparator (10) which checks on the basis of the path identification of the arrived cell and the information supplied by a memory (11) whether the cell is allocated to the trunk line (8), and releases the associated register of the intersection buffer (15) to be read out in case of allocation.

5. Asynchronous time-division multiplex transmission system comprising an interconnection element as defined in claim 4, characterized in that the output loading rate is increased by a factor of three relative to the element transmission rate.

6. Asynchronous time-division multiplex transmission system comprising an interconnection element as defined in claim 1, characterized in that each cell filter (7) reports the arrival of a cell for the trunk line (8) to an allocation circuit (12), which controls the reading process of the intersection buffers (15) in such a way that the cells are read out in the order in time in which they have arrived and when they have arrived simultaneously, in a predetermined order.

7. Asynchronous time-division multiplex transmission system comprising an interconnection element as defined in claim 6, characterized in that a cell filter (7) comprises a register (9) in which a cell supplied over an auxiliary line is written and includes a comparator (10) which checks on the basis of the path identification of the arrived cell and the information supplied by a memory (11) whether the cell is allocated to the trunk line (8), and releases the associated register of the intersection buffer (15) to be read out in case of allocation.

8. Asynchronous time-division multiplex transmission system comprising an interconnection element as defined in claim 1, characterized in that a cell filter (7) comprises a register (9) in which a cell supplied over an auxiliary line is written and includes a comparator (10) which checks on the basis of the path identification of the arrived cell and the information supplied by a memory (11) whether the cell is allocated to the trunk line (8), and releases the associated register of the intersection buffer (15) to be read out in case of allocation.

9. Asynchronous time-division multiplex transmission system comprising an interconnection element as defined in claim 1, characterized in that the output loading rate is increased by a factor of three relative to the element transmission rate.

10. A method of transmitting cells over an asynchronous time-division multiplex system comprising a plurality of auxiliary lines, each having a cell filter coupled thereto; a plurality of intersection buffers; a trunk line; and means for passing a cell from a selected filter to one of said intersection buffers for storage therein, when a path identification contained in said cell is allocated to said trunk line, in which cells supplied by said auxiliary lines and destined for said trunk line are transmitted at a predetermined interconnection element transmission rate, characterized by further comprising the steps of coupling an output buffer to outputs of said intersection buffers for delivering cells to said trunk line, and transmitting cells at least partly in parallel between said intersection buffers and said output buffer at an output loading transmission rate which is greater than said predetermined interconnection element transmission rate.

11. A method as claimed in claim 10, characterized by further comprising the steps of coupling a stage buffer to output buffers of the interconnection elements, and transmitting cells supplied by the interconnection elements to the stage buffer at a stage transmission rate which is greater than said element transmission rate.

12. A method as claimed in claim 10, characterized by always connecting the output buffers of the interconnection elements by a stage trunk line.

13. An asynchronous time-division multiplex transmission system for cells containing a path identification, comprising an interconnection element which transmits cells supplied by auxiliary lines (6) and destined for a trunk line (8), at a predetermined interconnection element transmission rate, said element comprising a respective cell filter connected to each of the auxiliary lines; and a respective intersection buffer (15) connected to each cell filter, said cell filter being arranged to pass a cell to the intersection buffer if the respective path identification is allocated to said trunk line, characterized in that said element comprises an output buffer (17), coupled to outputs of said intersection buffers, for delivering cells to said trunk line; and means for transmitting said cells between the intersection buffers and the output buffer at an output loading rate which is greater than said predetermined interconnection element transmission rate.

14. Asynchronous time-division multiplex transmission system comprising an interconnection element as defined in claim 13, characterized in that each cell filter (7) reports the arrival of a cell for the trunk line (8) to an allocation circuit (12), which controls the reading process of the intersection buffers (15) in such a way that the cells are read out in the order in time in which they have arrived and when they have arrived simultaneously, in a predetermined order.

15. An interconnection element adapted for use in an asynchronous time-division multiplex transmission system having a plurality of auxiliary lines (6) and a trunk line (8), for transmitting cells containing a path identification, received on said auxiliary lines at a predetermined interconnection element transmission rate, said element comprising a respective cell filter (7) connected to each of the auxiliary lines; and a respective intersection buffer (15) connected to each cell filter, said cell filter being arranged to pass a cell to the intersection buffer if the respective path identification is allocated to said trunk line, characterized in that said element comprises an output buffer (17), coupled to outputs of said intersection buffers, for delivering cells to said trunk line; and means for transmitting said cells at least partly in parallel between the intersection buffers and the output buffer, at an output loading rate which is greater than said predetermined interconnection element transmission rate.

16. An element as claimed in claim 15, characterized by comprising an allocation circuit for controlling the reading process of the intersection buffers, each cell filter being arranged for reporting the arrival of a cell for the trunk line to said allocation circuit, during said reading process, said cells being read out in the order in time in which they arrive, and when they have arrived simultaneously, the cells are read out in a predetermined order.

17. An element as claimed in claim 15, characterized in that each cell filter comprises a memory and a register, and means for writing a cell supplied over an auxiliary line into said register, a comparator for checking, on the basis of path identification of an arrived cell and information supplied by said memory, whether the cell is allocated to said trunk line, and means for releasing the associated register of the intersection buffer to be read out in case of allocation.

18. An element as claimed in claim 15, adapted for coupling the output buffer of the element to a stage buffer coupled to output buffers of other interconnection elements, and comprising means for transmitting cells to the stage buffer at a stage transmission rate which is greater than said element transmission rate.

19. An element as claimed in claim 15, further comprising means for connecting the output buffer of the interconnection element to a stage trunk line to which output buffers of other interconnection elements are always connected.

* * * * *